United States Patent
Brosnan et al.

(10) Patent No.: US 7,218,402 B1
(45) Date of Patent: May 15, 2007

(54) WAVEFRONT SENSOR USING HYBRID OPTICAL/ELECTRONIC HETERODYNE TECHNIQUES

(75) Inventors: Stephen John Brosnan, San Pedro, CA (US); Mark Ernest Weber, Hawthorne, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 286 days.

(21) Appl. No.: 10/727,473

(22) Filed: Dec. 4, 2003

(51) Int. Cl.
*G01B 11/02* (2006.01)
(52) U.S. Cl. .................................................. 356/484
(58) Field of Classification Search ................ 356/450, 356/484, 485, 489
See application file for complete search history.

(56) References Cited

U.S. PATENT DOCUMENTS

| | | | |
|---|---|---|---|
| 4,295,741 A * | 10/1981 | Palma et al. ................. | 356/484 |
| 4,847,477 A * | 7/1989 | Smith ....................... | 250/201.9 |
| 5,198,607 A | 3/1993 | Livingston et al. | |
| 6,229,616 B1 | 5/2001 | Brosnan et al. | |
| 6,366,356 B1 | 4/2002 | Brosnan et al. | |
| 6,972,887 B2 * | 12/2005 | Wickham et al. ........... | 359/237 |

\* cited by examiner

*Primary Examiner*—Gregory J. Toatley, Jr.
*Assistant Examiner*—Patrick Connolly
(74) *Attorney, Agent, or Firm*—Katten Muchin Rosenman LLP; John S. Paniaguas

(57) ABSTRACT

A hybrid optical/electronic wavefront sensor includes an electro-acoustical device used to upshift an optical reference signal. An optical test signal and the frequency upshifted optical reference signal are optically heterodyned to create a signal having a frequency equivalent to the beat frequency of the two signals, for example, the RF driving frequency of the Bragg cell. The optically heterodyned signal is then converted by way of a detector to an electronic signal having the same phase as the optical test signal. The output of the detector is a sinusoidal signal having the same phase as the phase of the optical test signal. This signal is filtered by way of an AC filter and mixed with a second clock signal, for example, a clock signal that is offset in frequency from the electro-acoustical drive signal by a frequency, for example, between 100 kHz and 1 MHz. These two signals are mixed by way of a mixer. The low frequency product of the mixer is passed by way of a filter and converted to a square wave by way of a comparator. The output of the comparator is applied to a simple pulse counter and used to disable the pulse counter. The pulse counter counts the clock pulses while it is enabled and is linearly related to the difference in phase between the optical test signal and the frequency upshifted signal.

16 Claims, 3 Drawing Sheets

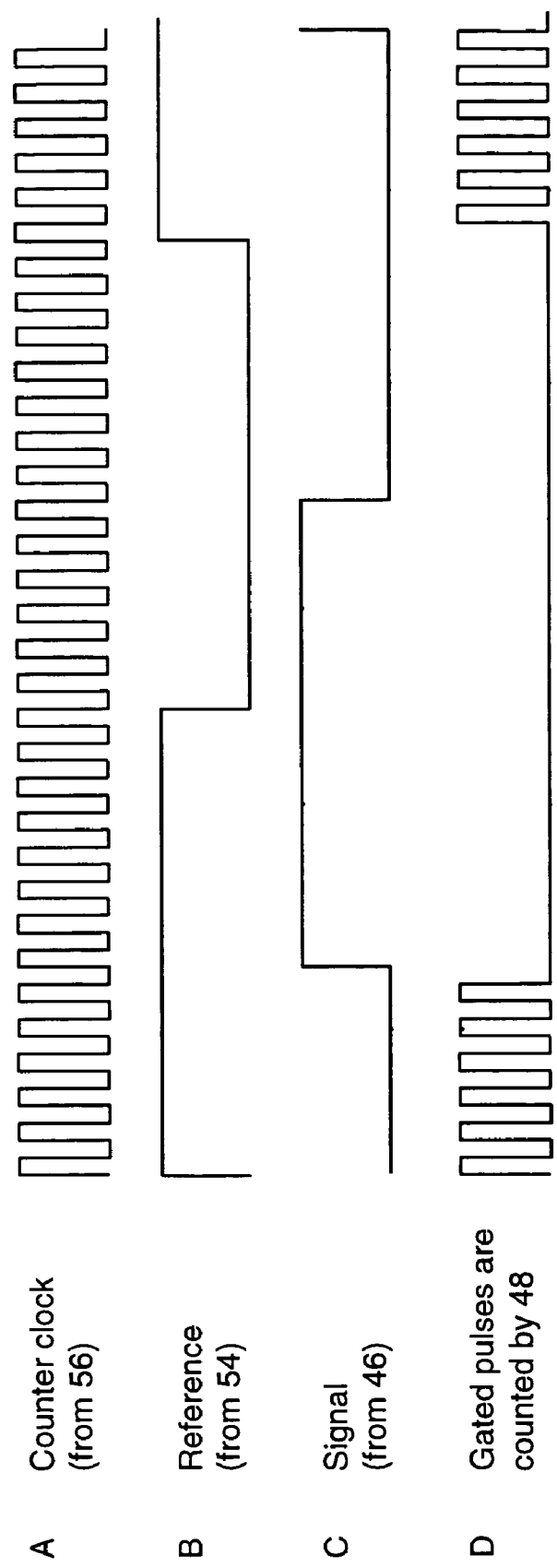

WAVEFRONT SENSOR USING HYBRID OPTICAL/ELECTRONIC HETERODYNE TECHNIQUES

BACKGROUND OF THE INVENTION

1. Field of the Invention

The present invention relates to an optical wavefront sensor and more particularly to an optical wavefront sensor which incorporates optical and electronic heterodyning to enable high accuracy and high speed phase measurements to be made, relative to known optical wavefront sensors.

2. Description of the Prior Art

Wavefront sensors are known to be used to correct for distortions in optical beams caused by, for example, atmospheric aberrations. In particular, such wavefront sensors are known to be used with high power laser weapon systems, for example, as disclosed in commonly owned U.S. Pat. No. 5,198,607. The effectiveness of such laser weapon systems depends on many factors including the power of the laser at the target. Atmospheric aberrations are known to cause distortion of the wavefront of high powered laser beams and thus reduce the power and effectiveness of such weapons. As such, systems are known which predistort the wavefront to compensate for atmospheric aberrations so that maximum laser power is delivered at the targets.

Examples of wavefront sensors are disclosed in commonly owned U.S. Pat. Nos. 6,229,616 and 6,366,356. These wavefront sensors are based upon optical heterodyning a reference optical signal with an optical test signal. More particularly, an electro-acoustical device, such as a Bragg cell, is used to frequency upshift an optical reference signal. The optical test signal and frequency upshifted optical reference signal are then optically combined, which results in optical heterodyning of the two optical signals. The resulting optically heterodyned signal has a frequency equivalent to the beat frequency of the two signals, the RF signal driving the Bragg cell, normally in tens of MHz. The optically heterodyned signal is subsequently directed to a detector which converts the optical signal to an electronic signal having the same phase as the optical test signal. The electronic heterodyned signal is then used to develop a compensation signal to compensate for phase distortion in the original optical test signal. More particularly, the output of the photodetector is a sinusoidal output with a phase equivalent to the original optical phase. A heterodyne signal processor is used to convert the sinusoidal waveform into a plurality of pulse trains whose duty cycles are proportional to the sampled optical phase. These pulse trains are electronically integrated by a low pass filter in order to develop a DC voltage that is proportional to the duty cycle and to the phase of the optical test signal.

There are several problems with such known optical heterodyne wavefront sensors. First, such wavefront sensors are relatively slow due to the need to integrate the pulse trains from the optical heterodyne processors. In addition, known acoustical optical devices, such as Bragg cells, normally frequency shift at frequencies in the tens of MHz. However at these frequencies, the electronic jitter of approximately 1 nanosecond of the devices used for edge detection can be a source of substantial phase measurement noise. Thus, there is a need for a optical wavefront sensor which is faster than known optical wavefront sensors while virtually eliminating electronic jitter.

SUMMARY OF THE INVENTION

Briefly the present invention relates to a hybrid optical/electronic wavefront sensor. The hybrid wavefront sensor includes an electro-acoustical device, such as a Bragg cell, that is used to upshift an optical reference signal. An optical test signal and the frequency upshifted optical reference signal are optically heterodyned to create a signal having a frequency equivalent to the beat frequency of the two signals, for example, the RF driving frequency of the Bragg cell. The optically heterodyned signal is then converted by way of a detector to an electronic signal having the same phase as the optical test signal. The output of the detector is a sinusoidal signal having the same phase as the phase of the optical test signal. This signal is filtered by way of an AC filter and mixed with a second clock signal, for example, a clock signal that is offset in frequency from the electro-acoustical drive signal by a frequency, for example, between 100 kHz and 1 MHz. These two signals are mixed by way of a mixer. The low frequency product of the mixer is passed by way of a filter and converted to a square wave by way of a comparator. The output of the comparator is applied to a simple pulse counter and used to disable the pulse counter. An electronic reference signal is formed by mixing the two RF signals, filtering the output, and squaring up the output by way of another comparator. The reference signal is used to start the pulse counter. A clock signal for the pulse counter is developed by squaring up the RF driving signal applied to the electro-acoustical device by way of a comparator. The pulse counter counts the clock pulses while it is enabled. The pulse count is linearly related to the difference in phase between the optical test signal and the frequency upshifted signal. The hybrid optical/electronic hybrid wavefront sensor in accordance with the present invention is about 250 times faster than known wavefront sensors and provides relatively more accurate phase measurement in spite of the 1 nanosecond jitter inherent in the electronic edge detection circuits.

DESCRIPTION OF THE DRAWINGS

These and other advantages of the present invention will be readily understood with reference to the following specification and attached drawing wherein:

FIG. 2 is a timing diagram of the various signals available in the wavefront sensor illustrated in FIG. 1B.

DETAILED DESCRIPTION

The present invention relates to an optical wavefront sensor which utilizes both optical and electronic heterodyning in order to provide relatively accurate and efficient measurements of the phase front of an optical waveform. Known optical wavefront sensors, such as those disclosed in U.S. Pat. Nos. 6,229,616 and 6,366,356, rely on integration of a pulse representative of an optically heterodyned signal in order to generate a signal representative of the optical phase of the optical test signal. Such integration slows the process down considerably. Moreover, as discussed above, a heterodyne signal processor is used to convert the output waveform from the forward detectors to a pulse train whose duty cycle is proportional to the sampled optical phase. The electronic jitter used for edge detection of these signals is on the order of a 1 nanosecond which can be a substantial source of phase measurement noise relative to the high speed devices used for edge detection in these applications. The present invention utilizes electronic as well as optical heterodyning which eliminates integration altogether, while at the same time enables lower cost and slower components to be used while improving the speed of the sensor output signal about 250 times while improving the accuracy substantially.

Figure 1A:
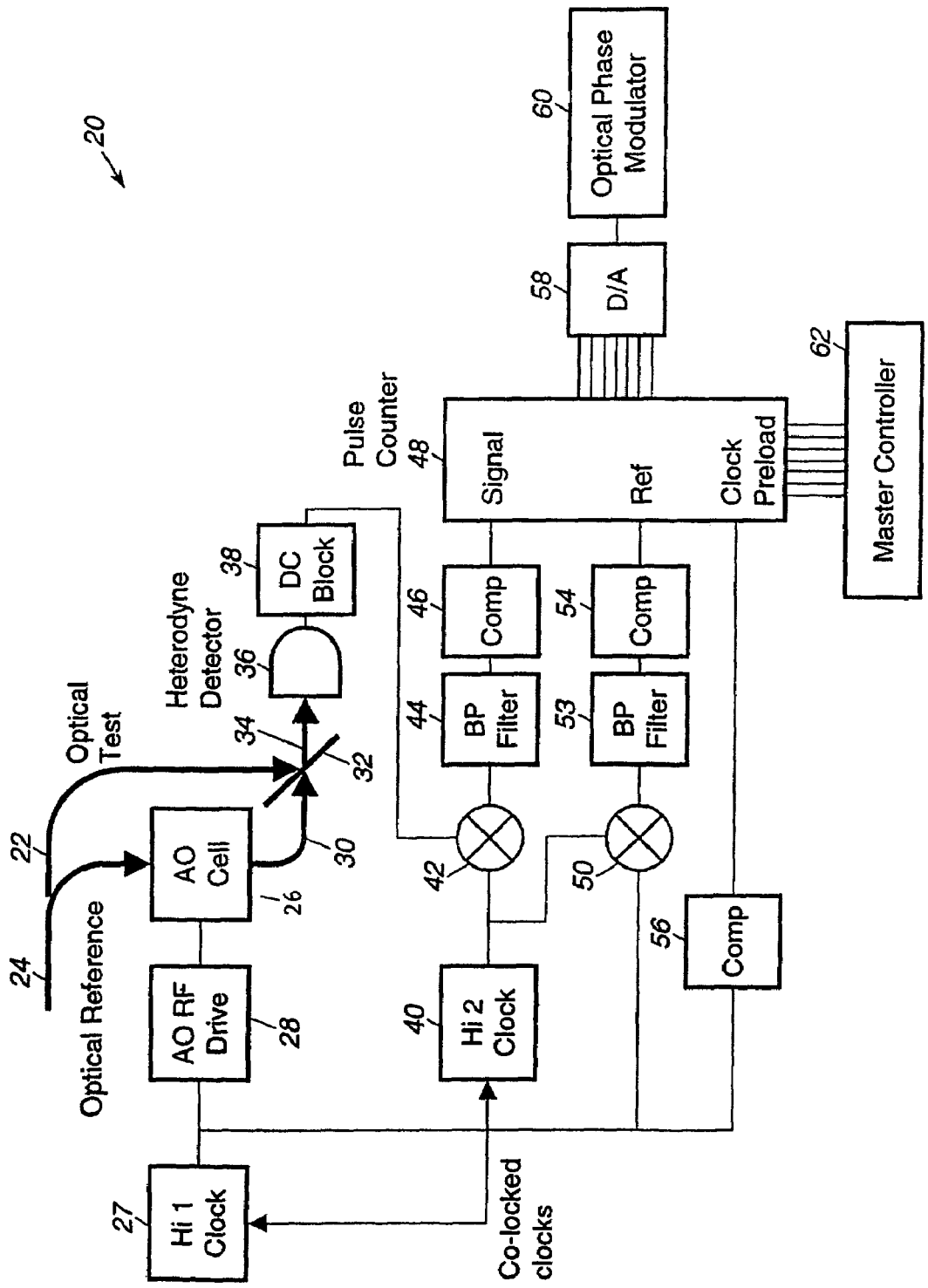
FIG. 1A is a block diagram of a hybrid optical/electronic wavefront sensor in accordance with the present invention.

Referring to FIG. 1A, the optical wavefront sensor in accordance with the present invention is generally identified with the reference numeral 20. An important aspect of the wavefront sensor 20 is that it employs both optical heterodyning and electronic heterodyning. In the first stage of the wavefront sensor, an optical test signal, identified with the reference numeral 22, is heterodyned with an optical reference beam 24. The optical reference beam 24 may be a beam of coherent light or an optical signal at a frequency y. The optical reference signal 24 is shifted by an optical frequency shifter 26. The optical frequency shifter 26 may be, for example, an electro-acoustical device, such as a Bragg cell. Such Bragg cells are driven by an RF signal which excites a crystal within the Bragg cell to create a sound wave. An RF driver 28, for example at frequency of $f_1$ of 40 MHz, may be used to drive the Bragg cell. The sound wave generated within the electro-acoustical device 26 changes the index of refraction of the crystal so that two beams emerge from the electro-acoustical device. One of the beams is unchanged in both path and frequency while the other reflects off the sound wave and is shifted in frequency by the frequency of the sound wave. For a 40 MHz drive signal, the optical reference signal 24 is shifted by 40 MHz. In addition to Bragg cells, the frequency shifter 26 may optionally be an optical modulator, such as a Mach-Zehnder modulator followed by a narrow pass band optical filter to extract the shifted side band light. The frequency upshifted beam, identified with the reference numeral 30, is available at the output of the optical phase shifter 26.

The frequency upshifted beam 30 is then optically heterodyned with an optical test signal 22. The optical heterodyning may be accomplished by way of a beam splitter 32, configured such that the light from the frequency upshifted beam 30 and the optical test signal 22 have approximately the same intensity. In particular, the optical test signal 22 is usually much brighter than the frequency of the frequency upshifted beam 30. As such, a relatively low split ratio beam splitter 32 is selected so that both beams 22 and 30 have generally the same intensity and thus interfere more strongly. Optical interference between the frequency upshifted beam 30 and the optical test beam 22 heterodynes the two optical beams 22 and 30 resulting in a signal 34 having a beat frequency representative of the RF modulation frequency of the drive signal 28 and a phase that corresponds to the state of the optical phase of the optical test signal 22. The heterodyned optical signal 34 is applied to a photodetector 36. The photodetector 36 generates an electronic sinusoidal signal having a frequency equal to the beat frequency between the optical test signal 22 and the upshifted reference signal 30 and a phase corresponding to the phase of the optical test signal 22. The output of the photodetector 36 is applied to a conventional DC blocking filter, such as a series capacitor filter 38.

In accordance with an important aspect of the invention, the electronic output of the photodetector 36 is electronically heterodyned with a clock signal 40 having a frequency $f_2$. In particular, the clock signal 40 is mixed with the output of the photodetector 36 by way of a mixer 42. The low frequency product of the mixer 42 is then filtered by a conventional bondpass filter 44 and squared up by way of a comparator 46 and applied to a pulse counter 48.

The pulse counter 48 is under the control of an electronic reference signal. The electronic reference signal is generated by mixing the clock signal from a clock 27 having a frequency $f_1$, used to drive the RF driver 28, with the clock signal $f_2$ from the clock 40. The second clock signal 40 is offset in frequency from the first clock signal 27 by, for example, 100 kHz to 1 MHz. The output of the low frequency product output of the second mixer 50 (i.e. $f_1-f_2$) is then filtered by a conventional band pass bandpass filter 52 and squared up by comparator 54 to form a reference signal that is applied to the pulse counter 48. The first clock signal 27 is squared up by way of a comparator 56 and used as the clock signal for the pulse counter 48.

The leading edge of the pulse of the output signal from the mixers 42 and 50 serve as control signals to stop and start the pulse counter 48, respectively. More particularly, the output of the clock 27 is squared up by a comparator 56 and used as a clock input for the pulse counter 48. The optical phase is measured by counting the pulses at the clock input while the pulse counter 48 is enabled. The reference signal (REF), available at the output of the comparator 54, is used as the start for the pulse counter 48. The signal (Signal), available at the output of the comparator 46, is used to disable the pulse counter 48. Since the difference in the phase between the mixer 42 and the mixer 50 is directly related to the difference in the phase between the optical test signal 22 and the frequency shifted RF drive signal 30, the pulse counter count signal will be linearly related to the measured optical phase and the electronic reference phase.

The sensor output signal may be converted to analog form by way of a digital-to-analog converter 58 and used to drive an optical phase modulator 60. Such optical phase modulators are known in the art. A suitable optical phase modulator is an electro-optic device, such as a lithium niobate waveguide. With such a device, a voltage applied to the top of the waveguide causes a refractive index change of the medium within the waveguide. The optical path of the emitted wave is changed by the waveguide length times the change in the refractive index. The phase change is the path change divided by the wavelength. Such devices are available at Eospace Inc. (www.eospace.com/phase-modulator.htm).

In order to pre-compensate for atmospheric aberrations, a phase offset may be preloaded into the pulse counter 48, for example, by a master controller 62 which may be a simple microprocessor. The phase offset is simply the difference between the electronic reference signal, available at the output of the clock 40, and the optical test signal, available at the output of the filter 38. The optical phase can be set to any desired phase shift from the reference edge of the clock 40 by specifying the difference in count between the electronic reference signal and the optical test signal.

Figure 1B:
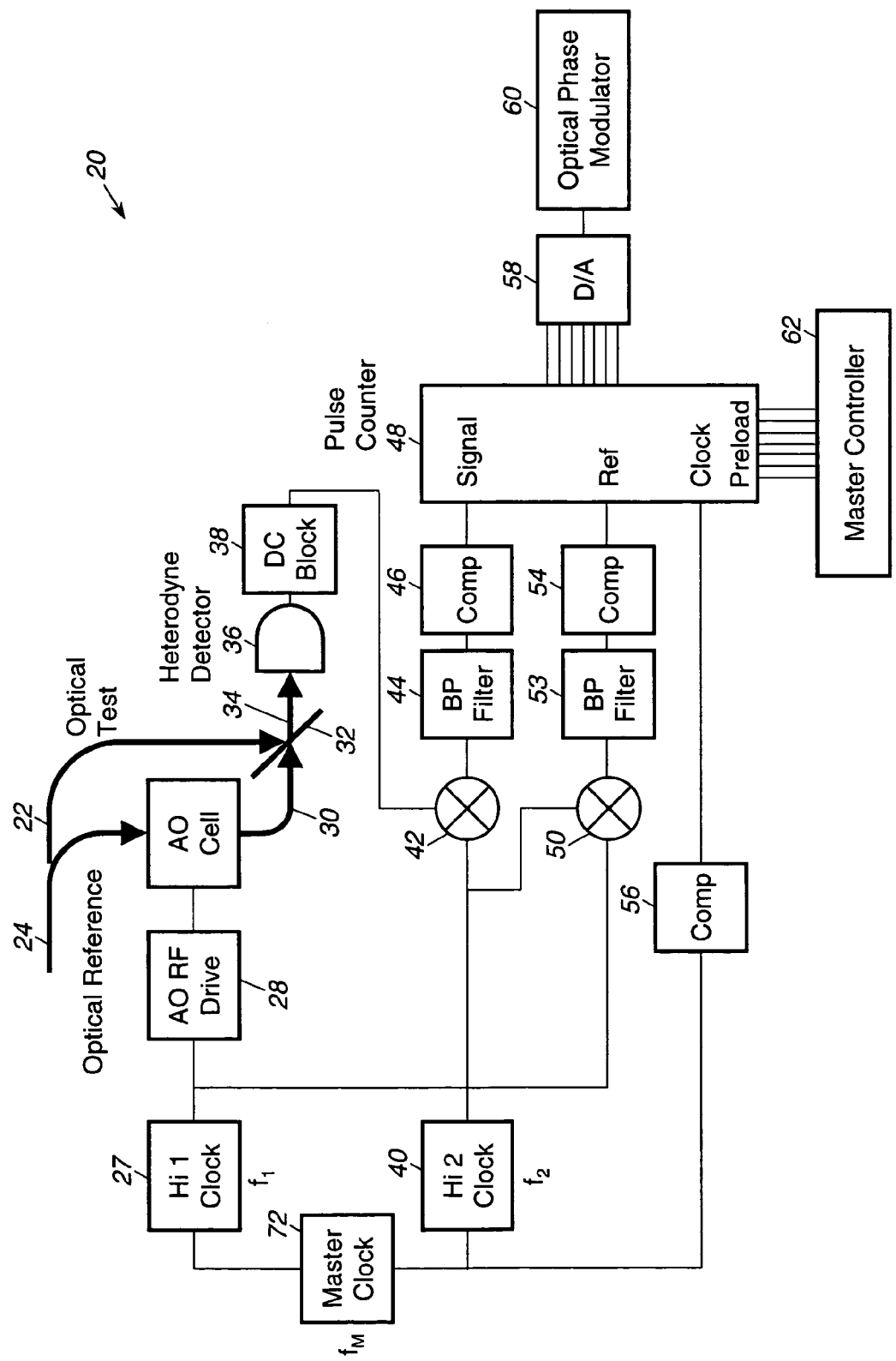
FIG. 1B is a block diagram of an alternate embodiment of the wavefront sensor illustrated in FIG. 1A.

FIG. 1B is an alternate embodiment of the wavefront sensor illustrated in FIG. 1A and is generally identified with the reference numeral 70. The wavefront sensor 70 is similar to the wavefront sensor 20 illustrated in FIG. 1A with the exception of the two clocks $f_1$ and $f_2$. Otherwise, like devices are identified with like reference numerals. In this embodiment, the two clocks 27 and 40 are locked together. For example, the clocks 27 and 40 may be synthesized from a master clock source 72 of a much higher frequency, for example, 256 MHz. The same master clock source 72 may be used as a clock source for the pulse counter 48, which results in even higher accuracy or higher speed.

A timing diagram for the various signals is illustrated in FIGS. 2A–2D. FIG. 2A illustrates the clock pulses applied to the pulse counter 48. FIG. 2B illustrates the reference signal (REF) which is used to start counting while the reference signal is high, the pulse counter 48 counts clock pulses. FIG. 2C illustrates the signal (Signal) used to stop counting of the pulse counter 48. This signal is active high and disables the pulse counter 48 when it goes high. FIG. 2D illustrates the clock pulses counted.

There are many advantages of the optical wavefront sensors illustrated in FIGS. 1A and 1B in accordance with the present invention. First, the optical rate for the front sensor is 250 times faster than other known wavefront sensors, such as disclosed in U.S. Pat. No. 6,243,168. Additionally, the wavefront sensor 20 is relatively more accurate. In particular, due to the relatively slower edge detection circuits possible, the 1 nanosecond jitter is no longer a factor providing improvement in the accuracy by a factor of 40 to 50 percent. In addition, the wavefront sensor provides a relatively low-cost solution relative to other known sensors. In particular, the implementation of beam steering of a fiber amplifier array requires temporal displacement of square waveforms, normally accomplished with relatively high-speed ICs. Wavefront sensor here allows much slower and therefore less costly component.

Obviously, many modifications and variations of the present invention are possible in light of the above teachings. Thus, it is to be understood that within the scope of the appended claims, the invention may be practiced otherwise than is specifically described above.

What is claimed and desired to be secured by a Letters Patent of the United States is:

1. An optical wavefront sensor comprising:
   an optical subsystem for optically heterodyning an optical test signal and an optical reference signal to generate an optically heterodyned signal;
   a photodetector for converting said optically heterodyned signal to an electronic heterodyned signal;
   an electronic subsystem for electronically heterodyning said electronic heterodyned signal and an electronic reference signal and generating a resultant signal;
   a pulse counter for counting said resultant signal;
   a control circuit for generating control signals for controlling said pulse counter; and
   a first clock signal for clocking said pulse counter.

2. The optical wavefront sensor as recited in claim 1, wherein said optical subsystem includes a beam splitter for optically combining said optical test signal with an optical reference signal.

3. The optical wavefront sensor as recited in claim 2, wherein said optical subsystem includes an optical frequency shifter for frequency shifting said optical reference signal.

4. The optical wavefront sensor as recited in claim 3, wherein said optical frequency shifter is an electro-acoustical device driven by an RF drive which in turn is driven by a said clock having a frequency $f_1$.

5. The optical wavefront sensor as recited in claim 4, wherein said electro-acoustical device is a Bragg cell.

6. The optical wavefront sensor as recited in claim 1, wherein said control circuit includes a second clock having a frequency $f_2$ and a mixer for mixing said first clock signal $f_1$ and said second clock signal $f_2$.

7. The optical wavefront sensor as recited in claim 6, wherein said second clock $f_2$ signal is offset from said first clock signal by a value between 100 KHz and 1 MHz.

8. The optical wavefront sensor as recited in claim 7, wherein the low frequency output signal $f_1$–$f_2$ from said mixer is used as a reference signal.

9. The optical wavefront sensor as recited in claim 1, wherein said pulse counter has a preload input to enable compensation values to be preloaded therein.

10. A method for measuring the phase of an optical test signal relative to a reference signal, the method comprising the steps of:
    (a) heterodyning the optical test signal with an optical reference signal to develop an optical heterodyned signal;
    (b) directing said optically heterodyned signal to a photodetector to generate a heterodyned signal having a test frequency equal to the beat frequency between the optical test signal and the optical reference signal and a phase equal to the optical test signal;
    (c) heterodyning said heterodyned signal with which an electronic reference signal to generate an electronic heterodyned signal; and
    (d) measuring the phase difference between said electronic reference signal and said electronic heterodyned signal and generating a signal representative of the difference therebetween.

11. The method as recited in claim 10, further including the step of squaring up said electronic heterodyned signal to develop pulses.

12. The method as recited in claim 11, wherein step (d) comprises counting said pulses by way of a pulse counter.

13. The method as recited in claim 12, further including the step (e) for generating stop and start signals to enable said pulse counter.

14. The method as recited in claim 13, wherein step (a) includes optically shifting an optical reference signal by way of an electro-acoustical device.

15. The method as recited in claim 14, wherein said step of optically shifting includes providing a first clock having a frequency $f_1$ and driving said electro-acoustical device at said first frequency $f_1$.

16. The method as recited in claim 15, wherein step (e) comprises generating a start signal by mixing said first clock signal having a frequency $f_1$ with said electronic reference signal having a frequency $f_2$.

* * * * *